J. B. BRISTOW.
SAW GUMMER.
APPLICATION FILED APR. 16, 1908.
932,677.
Patented Aug. 31, 1909.
2 SHEETS—SHEET 1.
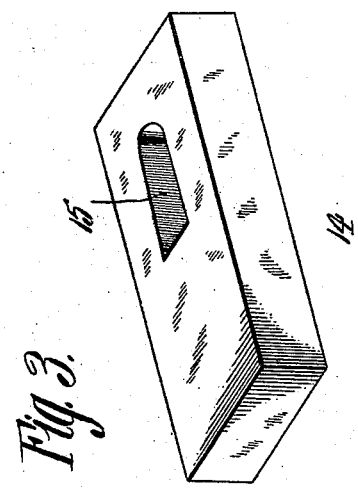
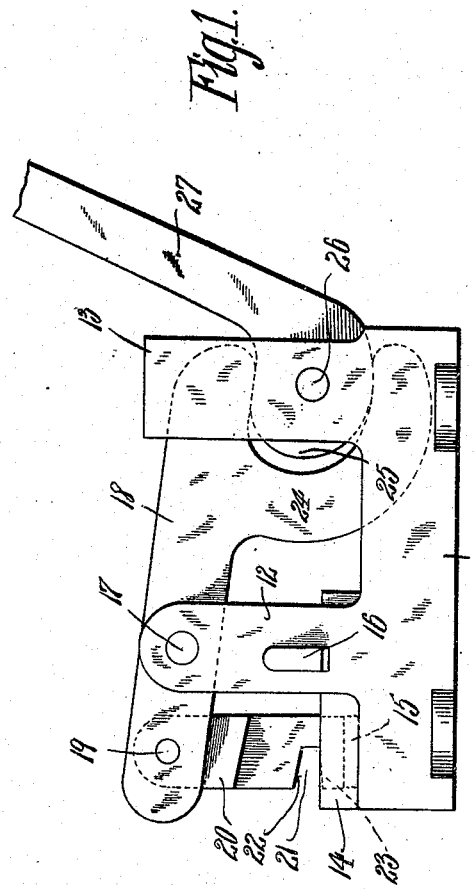
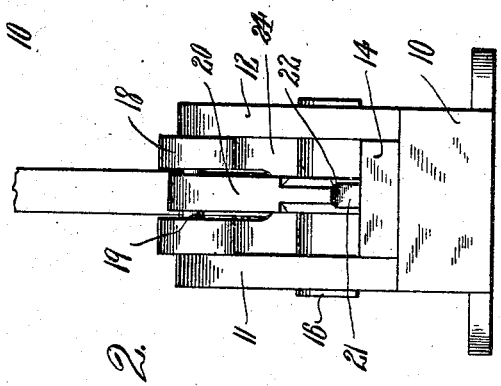
Witnesses
J. H. Crawford
C. H. Woodward
Inventor
James B. Bristow,
By Chandler & Chandler
Attorneys J. B. BRISTOW.
SAW GUMMER.
APPLICATION FILED APR. 16, 1908.
932,677.
Patented Aug. 31, 1909.
2 SHEETS—SHEET 2.
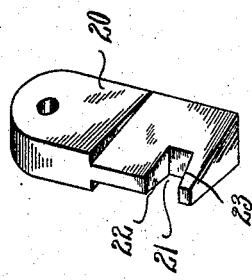
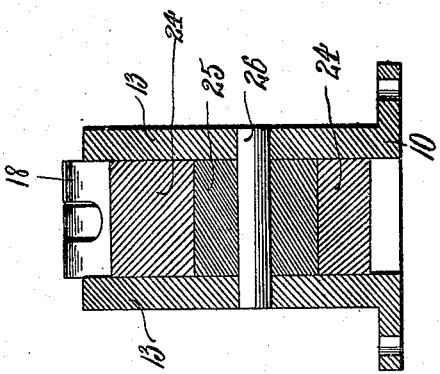
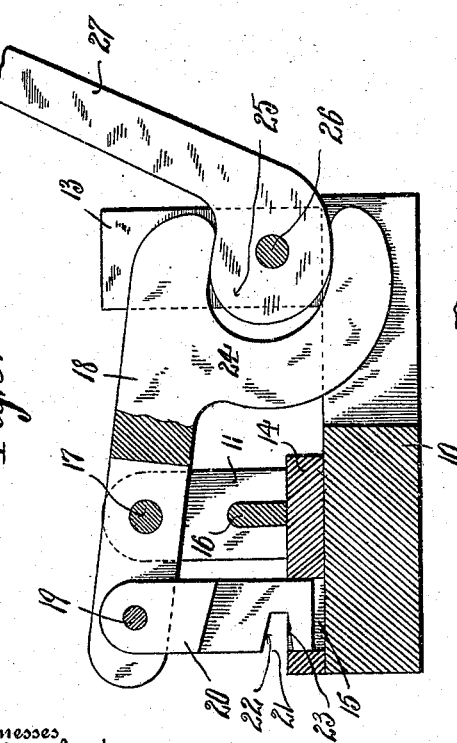
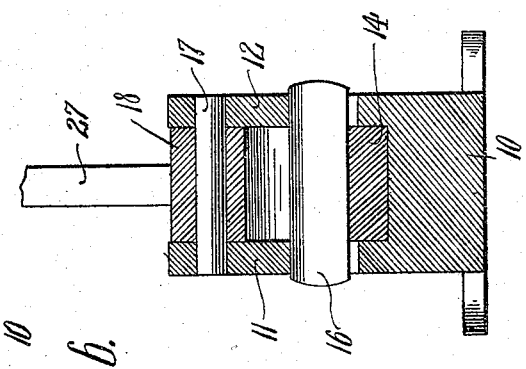
Witnesses
J. H. Crawford.
C. N. Woodward
Inventor
James B. Bristow,
By
Attorneys

UNITED STATES PATENT OFFICE.

JAMES B. BRISTOW, OF MONROE CITY, MISSOURI.

SAW-GUMMER.

932,677.  Specification of Letters Patent. Patented Aug. 31, 1909.

Application filed April 16, 1908. Serial No. 427,523.

*To all whom it may concern:*

Be it known that I, JAMES B. BRISTOW, a citizen of the United States, residing at Monroe City, in the county of Monroe, State of Missouri, have invented certain new and useful Improvements in Saw-Gummers; and I do hereby declare the following to be a full, clear, and exact description of the invention, such as will enable others skilled in the art to which it appertains to make and use the same.

This invention relates to saw gumming devices, and has for one of its objects to improve the construction and increase the utility and efficiency of devices of this character.

Another object of the invention is to provide a simply constructed device of this character which is forcibly operated in both directions through the saw to prevent the formation of "burs" or ragged edges at the margins of the cut made in the saw.

With these and other objects in view the invention consists in certain novel features of construction as hereafter shown and described and specifically pointed out in the claim, and in the drawings illustrative of the preferred embodiment of the invention, Figure 1 is a side elevation of the improved device. Fig. 2 is a front elevation of the improved device. Fig. 3 is a perspective view of the die block detached. Fig. 4 is a perspective view of the die detached. Fig. 5 is a longitudinal vertical section through the structure. Figs. 6 and 7 are vertical transverse sections taken at opposite ends of the structure.

The improved device comprises a supporting base 10 having spaced standards 11—12 rising therefrom and spaced from one end, and with spaced standard 13 rising from the other end. Resting upon the supporting base 10 and extending between the standards 11—12 is a die block 14 having a die aperture 15 conforming to the portion of the saw or other structure from which a portion is to be severed. The standards 11—12 are provided with transversely alining apertures through which a wedge key 16 is passed and bears upon the die block 14, the wedge key thus firmly holding the die block in position upon the base.

Pivoted at 17 between the standards 11—12 is a lever arm 18, and pivotally connected at 19 to the shorter forward end of the lever arm is a die 20, the latter fitting closely in the aperture 15. The die 20 is provided with an open transverse slot 21, the slot formed with its upper face 22 inclined, or diverging toward the open end of the slot, and the lower face 23 of the slot may be likewise inclined or diverging toward the open end of the slot, if preferred, the diverging form of the faces of the slot providing for a shearing action of the die, as hereafter explained.

The rear or longer end of the lever arm 18 is forked as at 24, and operating within this forked portion is a cam 25, the cam pivoted at 26 between the standards 13, and provided with an extended operating lever 27. By this arrangement it will be obvious that when the handle 27 is depressed the cam 25 will move the longer end of the lever arm 18 upwardly and depress the shorter forward end, and correspondingly depress the die 20 and cause the operating face 22 of the slot to sever the material which may be placed within the slot and upon the die block, while at the return stroke of the handle 27 the longer rear end of the lever arm 18 will be depressed and the die 20 elevated and cause the operating face 23 of the slot to pass upwardly carrying the severed portion of the metal with it and disposing it in transverse alinement with the upper face of the die block so that when the saw or other article is moved laterally to place another portion of the saw or another tooth cavity in position relative to the die, the previously severed portion of the saw will be dislodged. The inclined form of the face 22 of the slot insures a "shearing" action upon the metal, as will be obvious, thereby requiring less power to operate the device, and effectually preventing the formation of "burs" upon the under side of the metal, and also effectually preventing any cracking of the metal, but producing a clean cut through the metal.

The device is simple in construction, can be very strongly manufactured at relatively slight expense and in any required size, and operates effectually for the purposes described.

The cam 25 is so formed as to cause the leverage to increase as the member 27 is forced downwardly, to cause the die 20 to travel faster at the beginning of its downward stroke to take up all of the stock between the saw and the upper face 22, and then to travel slower and with greater force until the metal has been completely displaced under the face 22. This arrangement economizes in the travel of the lever, while still retaining the power at the point where it is most required.

What is claimed is:—

A device of the class described comprising a base member having substantially vertical standards, said standards having transversely alined key-ways, a die-block bearing upon said base and extending between said standards and held from lateral movement thereby, a wedge key extending through said key-ways and bearing upon said die-block and preventing upward movement thereto, a die movable through said die-block and having a transverse slot with cutting edges on its upper and lower faces, and an operating lever pivoted to said standards and connected to said die.

In testimony whereof, I affix my signature, in presence of two witnesses.

JAMES B. BRISTOW.

Witnesses:
D. C. SAUNDERS,
WM. R. YATES.